:

US007258813B2

(12) United States Patent
Roberts et al.

(10) Patent No.: US 7,258,813 B2
(45) Date of Patent: Aug. 21, 2007

(54) REFRIGERANT COMPOSITION

(75) Inventors: Neil A. Roberts, Bristol (GB); Owen R. Chambers, Bristol (GB)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/632,817

(22) Filed: Aug. 4, 2003

(65) Prior Publication Data

US 2005/0072956 A1    Apr. 7, 2005

Related U.S. Application Data

(60) Continuation-in-part of application No. 10/053,569, filed on Jan. 24, 2002, now abandoned, which is a division of application No. 09/351,355, filed on Jul. 12, 1999, now Pat. No. 6,428,720.

(30) Foreign Application Priority Data

Nov. 29, 2002  (GB) .................................. 0227891.9
Dec. 4, 2002   (GB) .................................. 0228306.7

(51) Int. Cl.
    C09K 5/04            (2006.01)
(52) U.S. Cl. .......................................... 252/68; 252/67
(58) Field of Classification Search ................. 252/67, 252/68; 62/86, 114, 115
    See application file for complete search history.

(56) References Cited

U.S. PATENT DOCUMENTS

| 4,755,316 | A | 7/1988 | Magid et al. |
| 5,032,306 | A | 7/1991 | Cripps |
| 5,520,833 | A | 5/1996 | Kaneko |
| 5,688,432 | A | 11/1997 | Pearson |
| 5,954,995 | A | 9/1999 | Goble |
| 6,065,305 | A | 5/2000 | Arman et al. |
| 6,076,372 | A | 6/2000 | Acharya et al. |
| 6,230,519 | B1 | 5/2001 | Arman et al. |
| 6,363,741 | B2 | 4/2002 | Takemasa |
| 6,428,720 | B1 | 8/2002 | Roberts |
| 6,511,610 | B2 | 1/2003 | Caron et al. |
| 6,526,764 | B1 | 3/2003 | Singh et al. |
| 6,606,868 | B1 | 8/2003 | Powell et al. |
| 6,629,419 | B1 | 10/2003 | Powell et al. |
| 6,655,160 | B2 * | 12/2003 | Roberts ....................... 62/114 |
| 6,695,973 | B1 | 2/2004 | Musso et al. |
| 6,783,691 | B1 | 8/2004 | Bivens et al. |
| 2002/0050583 | A1 | 5/2002 | Caron et al. |

FOREIGN PATENT DOCUMENTS

| CN | 1183451 | 6/1998 |
| CN | 1280166 A | 1/2001 |
| EP | 0 399 817 B1 | 11/1990 |
| EP | 0 430 131 A1 | 5/1991 |
| EP | 0 565 265 | 3/1993 |
| EP | 0 427 604 B1 | 4/1993 |
| EP | 0 539 952 B1 | 5/1993 |
| EP | 0 659 862 A1 | 6/1995 |
| EP | 0 565 265 B1 | 12/1995 |
| EP | 0 779 352 | 6/1997 |
| EP | 1 184 438 B1 | 3/2002 |
| EP | 1 193 305 A1 | 4/2002 |
| EP | 0 856 571 B1 | 4/2003 |
| GB | 2 247 462 | 4/1992 |
| GB | 2 247 462 A | 4/1992 |
| GB | 2 250 514 A | 6/1992 |
| GB | 2 291 884 | 7/1996 |
| GB | 2 327 427 A | 1/1999 |
| GB | 9923088.0 | 9/1999 |
| GB | 0005043.5 | 3/2000 |
| GB | 0010171.7 | 4/2000 |
| GB | 2 356 867 A | 6/2001 |
| JP | 4-18484 | 1/1992 |
| JP | 2576161 B2 | 1/1997 |

(Continued)

OTHER PUBLICATIONS

Database WPI, Section Ch, Week 8928, Derwent Publications Ltd., London, GB; An 89-202050, XP002078229 & JP 01 139675 A (Ashahi Glass Co., LTD.), (see Abstract) Jun. 1, 1989.

(Continued)

*Primary Examiner*—John R. Hardee
(74) *Attorney, Agent, or Firm*—Chyrrea J. Sebree; Mary Ann Capria

(57) ABSTRACT

Refrigerant compositions are provided which include:
(a) pentafluoroethane or trifluoromethoxydifluoromethane or hexafluorocyclopropane or mixtures thereof, in an amount from about 60 to about 70% by weight based on the weight of the composition;
(b) 1,1,1,2- or 1,1,2,2-tetrafluoroethane or trifluoromethoxypentafluoroethane or 1,1,1,2,3,3-heptafluoropropane or mixtures thereof, in an amount from about 26 to 36% by weight based on the weight of the composition; and
(c) an ethylenically unsaturated or saturated hydrocarbon, optionally containing one or more oxygen atoms, having a boiling point from −12° C. to +10° C., or a mixture thereof, or a mixture of one or more of the hydrocarbons with one or more other hydrocarbons or ethers, said mixture having a bubble point from −12° C. to +10° C., in an amount from about 1% to 4% by weight based on the weight of the composition. Also provided is a process of refrigeration using the refrigerant compositions and a refrigeration apparatus containing the refrigerant compositions.

12 Claims, 6 Drawing Sheets

FOREIGN PATENT DOCUMENTS

| | | |
|---|---|---|
| JP | 2576162 | 1/1997 |
| JP | 2584337 B2 | 2/1997 |
| JP | 1997059611 A | 3/1997 |
| JP | 01108291 | 10/1997 |
| JP | 3127138 B2 | 1/2001 |
| JP | 2002-226307 | 8/2002 |
| JP | 2002 228307 A | 8/2002 |
| JP | 3754198 B2 | 12/2005 |
| KR | 1997-022058 | 5/1997 |
| RU | 2 072 382 C | 1/1997 |
| RU | 2 135 541 | 8/1999 |
| RU | 2 161 637 C2 | 10/2001 |
| WO | WO93/01152 A2 | 1/1993 |
| WO | WO93/15163 A1 | 8/1993 |
| WO | WO94/00529 A1 | 1/1994 |
| WO | 95 08602 | 3/1995 |
| WO | WO96/03473 A1 | 2/1996 |
| WO | 96 15205 | 5/1996 |
| WO | WO97 34961 | 9/1997 |
| WO | WO 00/56834 | 9/2000 |
| WO | WO 01/23491 A1 | 4/2001 |
| WO | WO 01/23492 A1 | 4/2001 |
| WO | WO 01 23493 A1 | 4/2001 |
| WO | WO 02/24829 A1 | 3/2002 |
| WO | WO 02 26912 A | 4/2002 |
| WO | WO 02 26913 A2 | 4/2002 |

OTHER PUBLICATIONS

Roberts, "Determination of the Performance, Leak Scenario, Flammability and Oil Return Characteristics of a Novel R22 Replacement," Jul. 13, 1998.
Fluorocarbon azeotropes, Research Disclosure 16265 (1977).
JP 01 139678 (English Translation of the Abstract).
Pearson SF, "Uses of hydrocarbon refrigerants", I.I.F.-I.I.R. Commissions B1, B2, E1 and E2, pp. 439-46 (1996).
E-mail reply from Herrick Conference to Felix Flohr dated May 27, 2003.
Internet citation, "Conference Organizing Committee", http://www.ecn.purdue.edu/Herrick/Events/organize-frame.htm.
Internet citation, "Registration Information", http://www.ecn.purdue.edu/Herrick/Events/Registration.htm.
Ashrae Standard 34-2001, "Contents", pp. 7 and 13.
Sworn Statement by Christoph Meurer.
Birett K, "Information sheets on hazardous substances" (1998).
Soffientini et al., "Evaluation of alternative refrigerants when retrofitting R-22 refrigeration systems", Centro Studio Galileo—Industria & Formazione Eleventh European Conference, Milan, Italy (2005).
JP 01 139675 (English Translation of the Abstract).
Roberts NA, "Determination of the performance, leak scenario, flammability and oil return characterictics of novel R22 replacement", Proceedings of the Seventh International Refrigeration Conference at Purdue University, West Lafayette, Indiana (1998).
Musso E et al., "Miscele temarie a base di HFC contenenti idrocarburi come sostituti "drop in" di R12 nella refrigerazione domestica", Conference on Conditioning, Heating, Refrigeration: Innovations and Trends, Milan, Italy (1997).
Wilson, DP, Richard, RG; "Determination of Refrigerant Lower Flammability Limits in Compliance with Proposed Addendum p to Standard 34"; ASHRAE Transactions 2002, vol. 108; pp. 1-17; Jun. 23, 2002.
Roberts, Na, Pearson, Sf; "High Efficiency R22 Replacement (ISCEON 59, a mixture of R125, R134a and isobulane)"; Congress Symposium Meeting-Colloque, 1996 Int. Compressor Eng. Conf., Purdue, Jul. 23, 1996.
Roberts, NA; "Energy Saving Refrigerant Blends Comprising R125, R134a, R600 or R600a"; European Conference (Milan); p. 108; Jun. 17-18, 2005.
"Final Draft International Standard-Projet Final de Norme Internationale"; International Electrotechnical Commission, IEC; Dec. 17, 2004.
Sanders Pa., "Table 14-2 Flammability Limits of Various Propellants in Air", Handbook of Aerosol Technology Second Edition, Malabar, Florida, pp. 233, 250 (1987).
Chart: Vapor Composition Flammability Data Mar. 2006.
English Abstract: JP 01108291 Oct. 1997.
English Abstract: RU 2161637 Oct. 2001.
R417A—M6DS Sheet (Product available circa 2001).

\* cited by examiner

REFRIGERANT COMPOSITION

This application is a continuation-in-part-of U.S. application Ser. No. 10/053,569, now abandoned, filed Jan. 24, 2002, which, in turn, is a divisional of U.S. application Ser. No. 09/351,355, filed Jul. 12, 1999, now U.S. Pat. No. 6,428,720. The present application claims priority based upon Great Britain Applications No. GB 0227891.9, filed Nov. 29, 2002 and GB 0228306.7, filed Dec. 4, 2002. The contents of all the above applications are incorporated herein by reference in their entirety.

FIELD OF THE INVENTION

The present invention relates to refrigerant compositions, particularly for use in refrigeration equipment and air conditioning systems.

BACKGROUND OF THE INVENTION

Refrigeration and air conditioning equipment frequently require large amounts of cooling. Recently, R22 ($CHClF_2$) has been used for this purpose. However, since R22 is an ozone depleter that will be phased out over the next decade, in accordance with the Montreal protocol, there is a need for an alternative refrigerant that has similar properties to R22, but is not an ozone depleter. Of particular concern is that the temperature/vapour pressure relationship for such a refrigerant should be sufficiently similar to R22 that it can be used in R22 equipment without having to change the control systems which are usually programmed in the factory making the equipment.

This is of particular concern for systems that have sensitive control devices, which rely on both the inlet pressure to the expansion valve and the outlet pressure. These control systems are based on R22 properties. Therefore, if an R22 substitute does not have a temperature/vapour pressure behavior which is similar to R22, the system will not operate correctly.

By similar, it is meant that the vapour pressure of the substitute should not differ from that of R22 by more than ±12% and preferably not more than ±6% at any given mean evaporating temperature between −40° C. to +10° C. It is also important that any such refrigerant has a similar capacity and efficiency as R22. Similar capacity means a capacity that is no more than 20% lower than that of R22 and preferably not more than 10% lower than R22 at mean evaporating temperatures between −35° C. to −28° C. Similar efficiency means not more than 10% lower than that of R22 and preferably not more than 5% lower at mean evaporating temperatures between −35° to −280° C.

SUMMARY OF THE INVENTION

The present invention provides a refrigerant composition which comprises a mixture of:

(a) pentafluorethane, trifluoromethoxydifluoromethane or hexafluorocyclopropane, or a mixture of two or more thereof, in an amount of from about 60 to about 70% by weight based on the weight of the composition;

(b) 1,1,1,2- or 1,1,2,2-tetrafluorethane, trifluoromethoxypentafluoroethane, 1,1,1,2,3,3-heptafluoropropane or a mixture of two or more thereof, in an amount of from about 26 to about 36% by weight based on the weight of the composition; and (c) an ethylenically unsaturated or saturated hydrocarbon, optionally containing one or more oxygen atoms, with a boiling point from −12° C. to +10° C., or a mixture thereof, or a mixture of one or more of said hydrocarbons with one or more other hydrocarbons, said mixture having a bubble point from −12° C. to +10° C., in an amount from about 1% to about 4% by weight based on the weight of the composition. It has surprisingly been found that these particular formulations have properties which enable them to be used as a replacement for R22.

The percentages quoted above refer, in particular, to the liquid phase. The corresponding ranges for the vapour phase are as follows:

(a) about 70 to 87%, (b) about 10-28%, and (c) about 0.9-4.1%, all by weight based on the weight of the composition. These percentage preferably apply both in the liquid and vapor phases.

The present invention also provides a process for producing refrigeration which comprises condensing a composition of the present invention and thereafter evaporating the composition in the vicinity of a body to be cooled. The invention also provides a refrigeration apparatus containing, as refrigerant, a composition of the present invention.

BRIEF DESCRIPTION OF THE DRAWING FIGURES

DETAILED DESCRIPTION OF PREFERRED EMBODIMENTS

Figure 1:
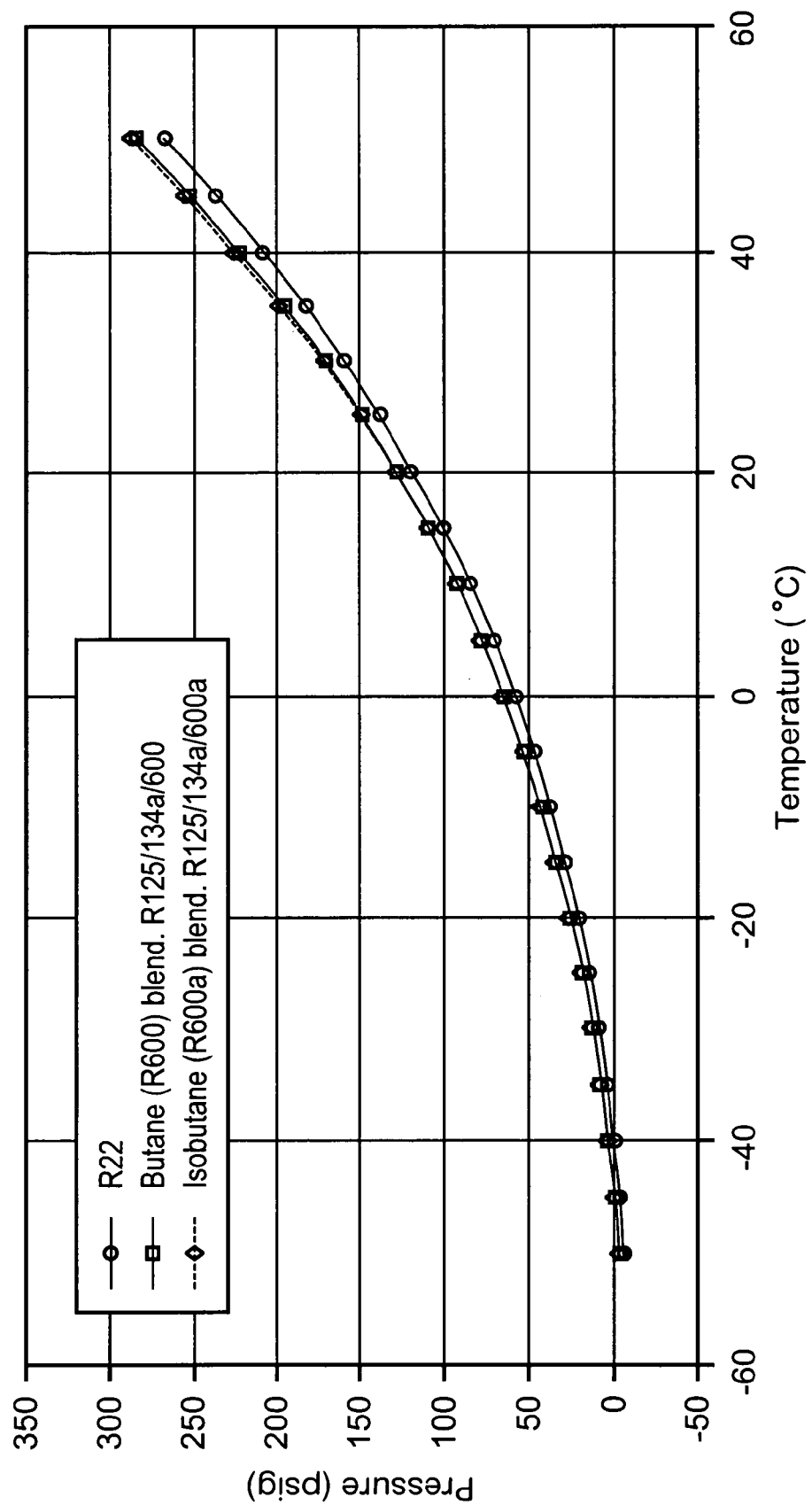
FIG. 1 is a graph showing vapor pressures of blends according to the invention.
Figure 2:
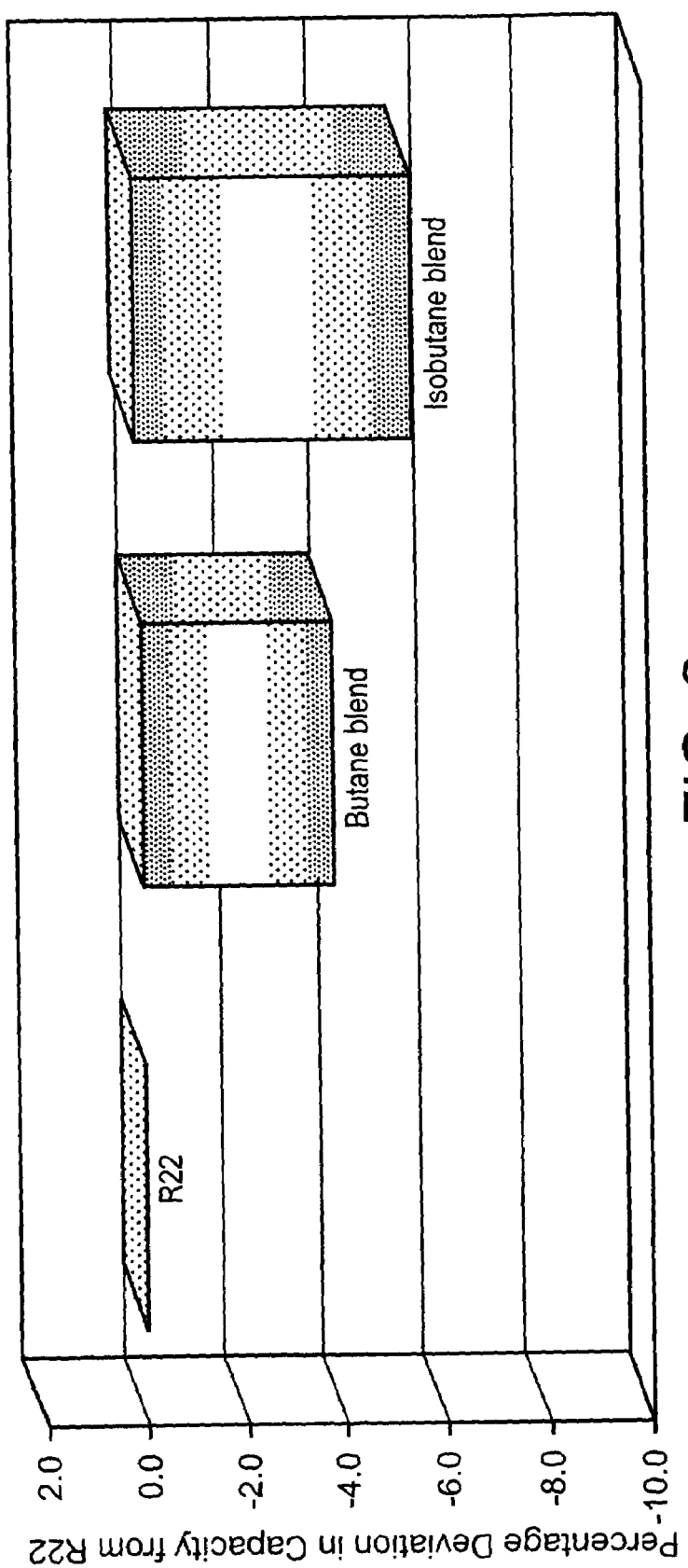
FIG. 2 is a graph depicting capacities for blends prepared according to the invention.
Figure 3:
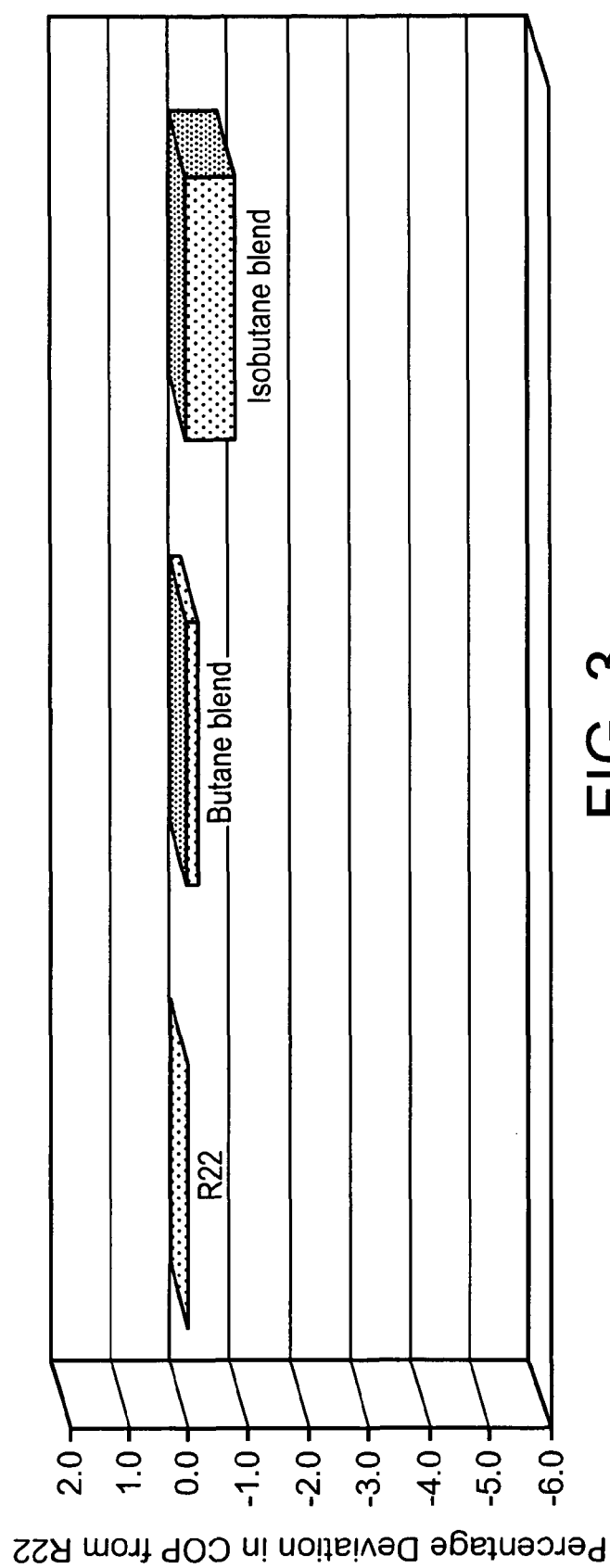
FIG. 3 is a graph showing COP results for blends of the invention.
Figure 4:
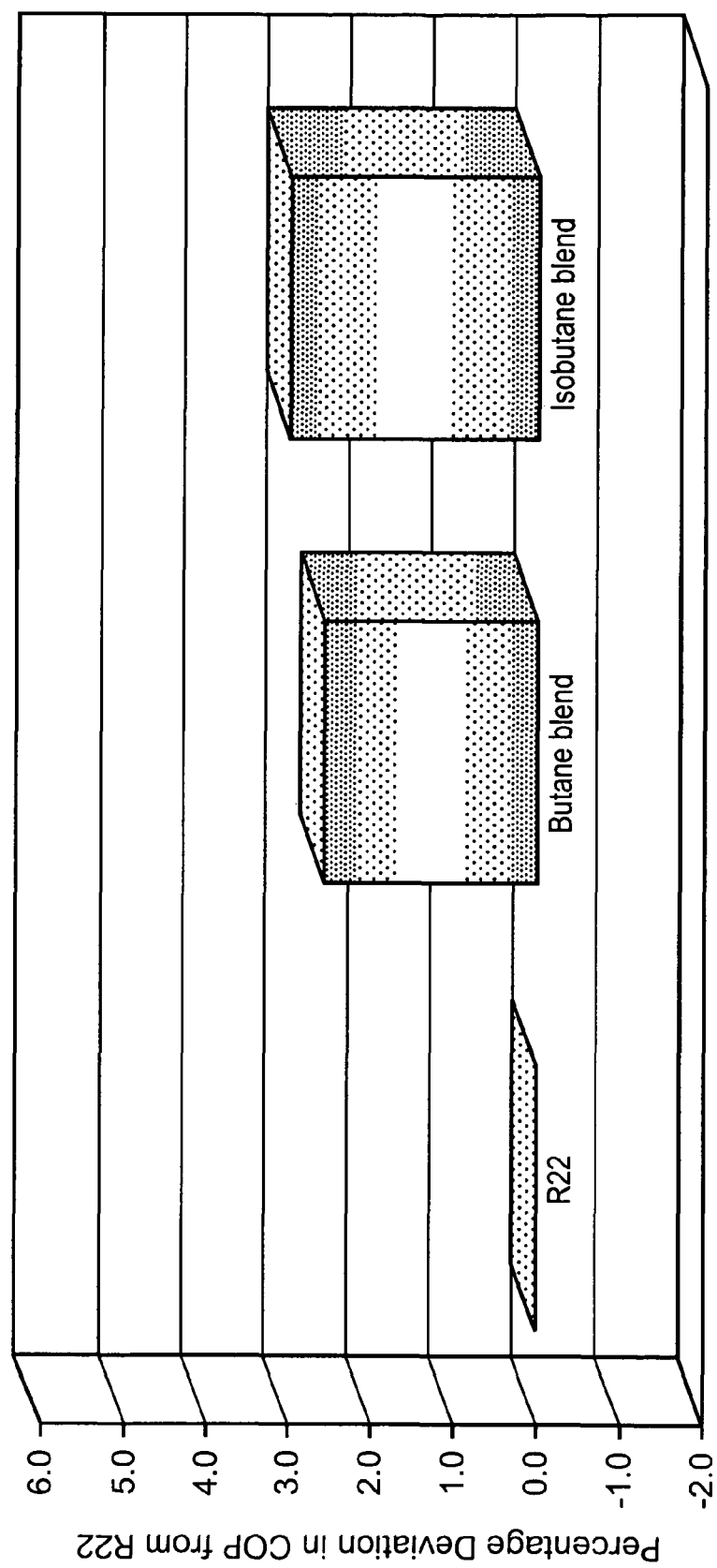
FIG. 4 is a graph showing COP results at a constant capacity for compositions of the invention.
Figure 5:
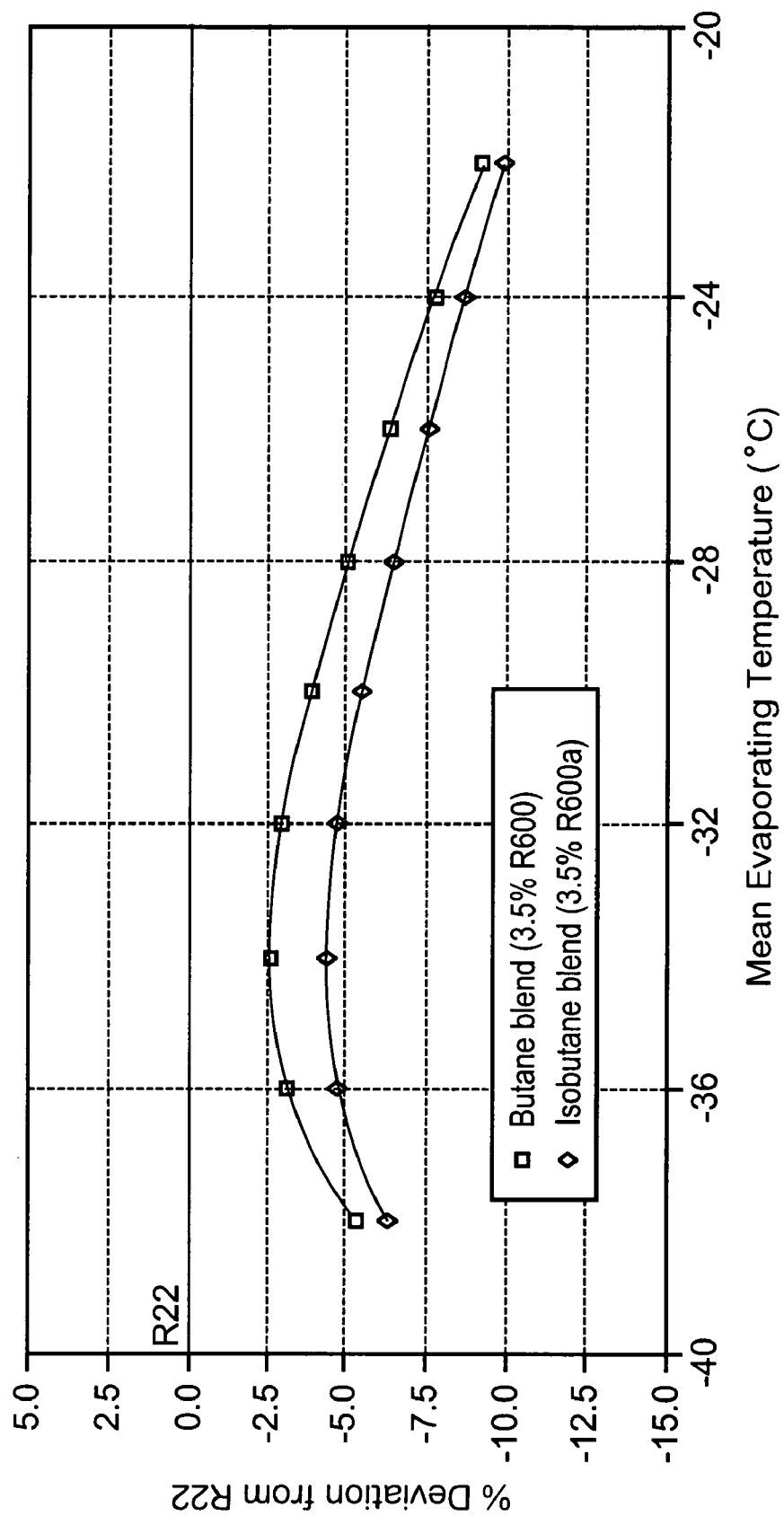
FIG. 5 is a graph showing the capacity of blends of the invention.
Figure 6:
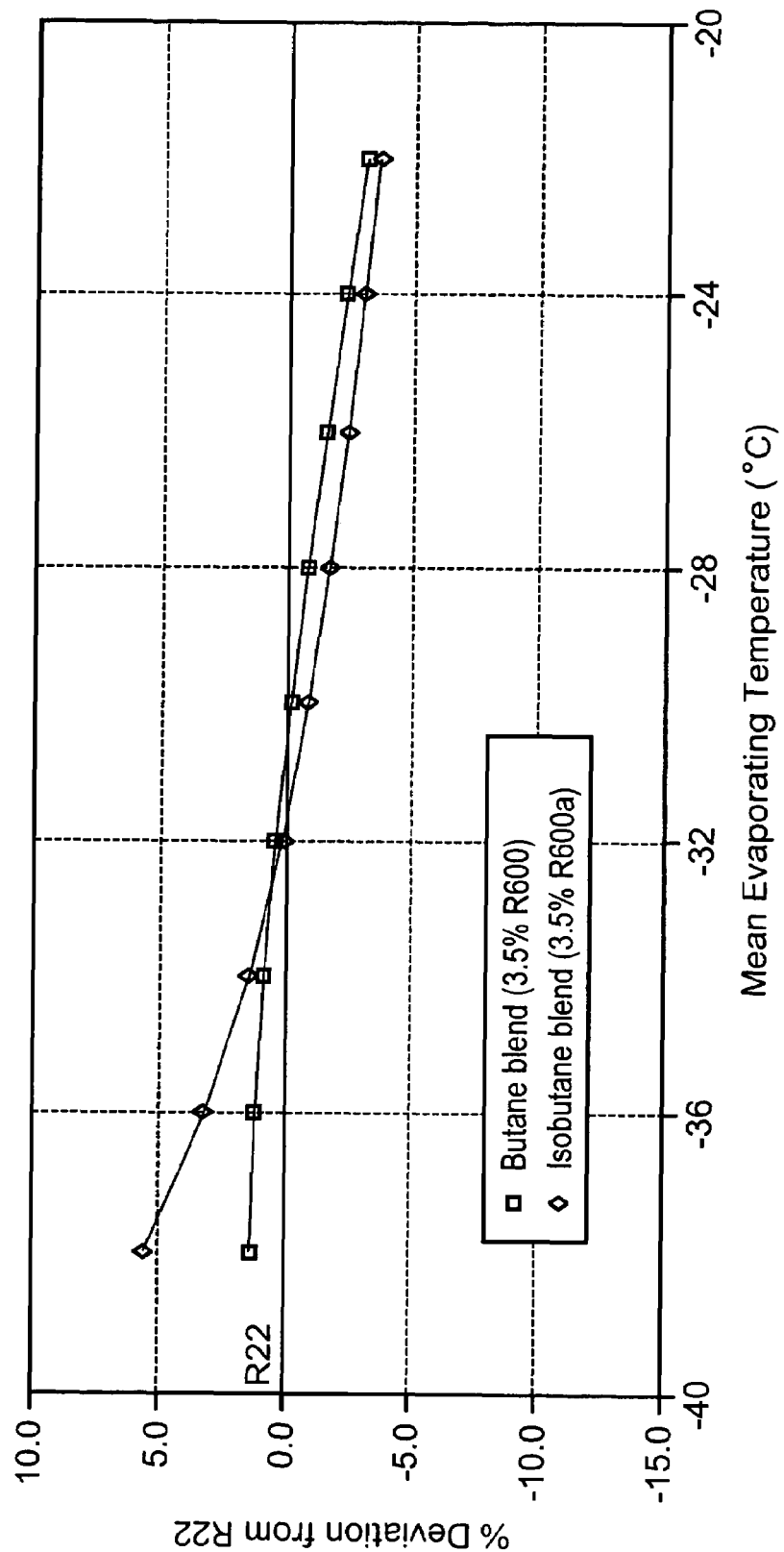
FIG. 6 is a graph comparing the COP of blends of the invention and R22.

Component (a) is present in an of amount from about 60 to about 70% by weight based on the weight of the composition. Preferably, the concentration is about 62 to about 67%, especially above 64% and up to 66%, by weight. Preferably, component (a) is R125 (pentafluorethane) or a mixture containing at least half, especially at least three quarters (by mass) of R125. Most preferably component (a) is R125 (alone).

Component (b) is present in the composition in an amount from about 26 to about 36%, especially about 28 to about 32% by weight based on the weight of the composition. Component (b) is preferably a mixture containing at least half, especially at least three quarters (by mass) of R134a (1,1,1,2-tetrafluoroethane). Most preferably component (b) is R134a (alone).

The weight ratio of component (a) to component (b) is desirably at least 1.5:1, preferably 1.5:1 to 3:1 and especially 1.8:1 to 2.2:1.

Component (c) is a saturated or ethylenically unsaturated hydrocarbon, optionally containing one or more oxygen atoms, in particular one oxygen atom, with a boiling point from −12° C. to +10° C., especially −12° C. to −5° C. or a mixture thereof. Preferred hydrocarbons which can be used contain three to five carbon atoms. They can be acyclic or cyclic. Acyclic hydrocarbons or ethers which can be used include propane, n-butane, isobutane and ethylmethyl ether.

Cyclic hydrocarbons which can be used include methyl cyclopropane. Preferred hydrocarbons include n-butane and isobutane, with n-butane being especially preferred. Component (c) can also be a mixture of such a hydrocarbon with one or more other hydrocarbons or ethers, said mixture having a bubble point from −12° C. to +10° C., especially −12° C. to −5° C. Other hydrocarbons or ethers which can be used in such mixtures includes pentane, isopentane, propene, dimethyl ether, cyclobutane, cyclopropane and oxetan.

The presence of at least one further component in the composition is not excluded. Although the composition typically will comprise the three essential components listed above, at least one further component can also be present. Typical further components include fluorocarbons and, in particular, hydrofluorocarbons, such as those having a boiling point at atmospheric pressure of at most −40° C., preferably at most −49° C., especially those where the F/H ratio in the molecule is at least 1. Preferable fluorocarbons include R23 (trifluoromethane) and, most preferably, R32 (difluoromethane).

In general, the maximum concentration of these other ingredients does not exceed about 10%, preferably not exceeding 5% and most preferably not exceed about 2% by weight, based on the sum of the weights of components (a), (b) and (c). The presence of hydrofluorocarbons generally has a neutral effect on the desired properties of the formulation. Desirably one or more butanes, especially n-butane and/or iso-butane, represents at least about 70%, preferably at least about 80% and more preferably at least about 90% by weight of the total weight of hydrocarbons in the composition. It will be appreciated that it is preferable to avoid perhalocarbons so as to minimise any greenhouse effect and to avoid hydrohalogenocarbons having halogens heavier than fluorine. The total amount of such halocarbons should advantageously not exceed about 2% especially 1% and more preferably 0.5% by weight.

According to a preferred embodiment, the composition comprises, as component (a), about 62 to 67% based on the weight of the composition of pentafluoroethane; as component (b) about 3 to 35% by weight based on the weight of the composition of 1,1,1,2-tetrafluoroethane; and as component (c), butane or a mixture of hydrocarbons comprising butane. When component (c) is a mixture, the concentration of butane in the mixture is preferably at least about 50% by weight, especially at least 70% by weight, more preferably at least 80% by weight and even more preferably at least 90% by weight, based on the weight of the composition. The other component of the mixture is preferably pentane.

It has been found that the compositions of the present invention are highly compatible with the mineral oil lubricants conventionally used with CFC refrigerants. Accordingly, the compositions of the invention can be used with fully synthetic lubricants such as a polyol esters (POE), polyalkyleneglycols (PAG) and polyoxypropylene glycols or with fluorinated oil as disclosed in EP-A-399817 and also with mineral oil and alkyl benzene lubricants including napththenic oils, paraffin oils and silicone oils and mixtures of such oils and lubricants with fully synthetic lubricants and fluorinated oil.

The usual additives can be used including "extreme pressure" and antiwear additives, oxidation inhibitors, thermal stability improvers, corrosion inhibitors, viscosity index improvers, pour point depressants, detergents, antifoaming agents and viscosity adjusters. Examples of suitable additives are included in Table D n U.S. Pat. No. 4,755,316, the disclosure of which is incorporated herein in its entirety.

In some embodiments, Component (c) is used in an amount from about 1% to about 4% by weight based on the weight of the composition. And, in other embodiments, component (c) is present in an amount from about 3% to about 4% by weight of the composition. In some embodiments, Component (c) is 3.5 wt. %.

The invention will be illustrated by the following Examples which are intended to be merely exemplary and in no manner limiting.

EXAMPLES

The samples used for testing are detailed below:

| | |
|---|---|
| Butane (3.5%) blend: | R125/134a/600 (65.0/31/5/3.5) |
| Isobutane (3.5%) blend: | R125/134a/600a (64.9/31.7/3.4) |

Equipment and Experimental

The samples, each approximately 600 g, used for the determination of the vapour pressures were prepared in aluminum disposable cans (Drukenbehalter—product 3469), which were then fully submerged in a thermostatically controlled water bath. For each determination, the can was charged with about 600 g. A maximum of two samples could be processed at any one time. The bath temperature was measured using a calibrated platinum resistance thermometer (152777/1B) connected to a calibrated Isotech TTI1 indicator. Pressure readings were taken using the two calibrated Druck pressure transducers, DR1 and DR2.

The temperature of the bath was set to the lowest temperature required and it was then left until it had cooled. When the temperature and pressure had remained constant for at least a quarter of an hour, they were then recorded. Further temperature and pressure readings were taken in increments of 5° C. to a maximum of 50° C., each time ensuring that they were steady for at least a quarter of an hour before recording them.

The data obtained does not give the dew point and as such, does not give the glide. An approximate evaluation of the glide can be obtained by using the REFPROP 6 program. The relationship of the glide to the bubble point can be represented by a polynomial equation. This equation can be used to give an approximate glide for the experimentally determined bubble points. This is effectively a normalisation of the calculated glide to the experimentally determined data. The dew point pressures can then be approximated by subtracting the temperature glide from the temperature in the bubble point equation.

These equations are then used to obtain vapour/pressure tables. The experimental equation derived for the bubble points and the glide equation from REFPROP 6 are shown in Table 1.

Notes:
1. In this equation x=1/T, where T is the bubble point in Kelvin: y=1 n(p), where p is the saturated vapour pressure in psia. To convert psia to MPa absolute pressure, multiply by 0.006895.
2. In this equation x=t, where t is liquid temperature (bubble point) in degree C. and y=glide in degree C. at the bubble point temperature.
3. The vapour pressures for R22 were obtained from the Ashrae handbook by interpolation.

Determination of the Performance of the Refrigerants on the Low Temperature (LT) Calorimeter.

Equipment and General Operating Conditions

The performance of the refrigerants was determined on the low temperature (LT) calorimeter. The LT calorimeter is fitted with a Bitzer semi-hermetic condensing unit containing Shell SD oil. The hot vapour passes out of the compressor, through an oil separator and into the condenser. The discharge pressure at the exit of the compressor is kept constant by means of a packed gland shut-off valve. This inevitably has an effect on the condensing pressure/temperature—the system is actually condensing at a temperature below 40% C. The refrigerant then travels along the liquid line to the evaporator.

The evaporator is constructed from 15 mm Cu tubing coiled around the edges of a well-insulated 32-litre SS bath. The bath is filled with a 50:50 glycol:water solution and heat is supplied by 3×1 kW heaters controlled by a PID controller. A stirrer with a large paddle ensures that the heat is evenly distributed. The evaporating pressure is controlled by an automatic expansion valve. The refrigerant vapour returns to the compressor through a suction line heat exchanger.

Twelve temperature readings, five pressure readings, compressor power and heat input are all recorded automatically using Dasylab. The tests were run at a condensing temperature of 40° C. and an evaporator superheat of 8° C. (±0.5° C.). For R22 the temperature at the end of the evaporator was maintained at 8° C. above the temperature equivalent to the evaporating pressure (bubble point). For the other refrigerants, the temperature at the end of the evaporator was maintained at 8° C. above the temperature equivalent to the evaporating pressure (Dew point). The mean evaporator temperature for these refrigerants was calculated by taking the temperature equivalent to the evaporator pressure from the bubble point table and adding to that half the glide at that temperature.

When running the calorimeter, the evaporating and condensing pressures are initially set to an approximate value along with the temperature of the bath. The calorimeter is then allowed time for the conditions to stabilise. During this period, coarse adjustments can be made. Conditions must also be monitored in order to ensure that sufficient heat is being put into the bath to avoid any liquid getting back to the compressor. When the system is virtually steady, fine adjustments of pressure and temperature are made until the calorimeter has stabilised at the required evaporating pressure with a condensing pressure equivalent to 40° C. and an evaporator superheat of 8° C. (Note: the superheat is measured from the third evaporator outlet). The run is then commenced and run for a period of one hour, during which time no adjustments are made to the system, except for possibly minor changes to the condensing pressure to compensate for fluctuations in the ambient temperature.

Specific Experimental Details for Each Refrigerant

R22: The calorimeter was charged with R22 (3.5 kg into the liquid receiver). Ten data points were obtained between the evaporating temperatures of −38° C. and −22° C.

Butane (3.5%) blend: Approximately 3.55 kg were charged into the liquid receiver and five data points were obtained between the mean evaporating temperatures of −38° C. and −22° C.

Isobutane (3.5%) blend: Approximately 3.48 kg of the blend were charged into the liquid receiver of the LT-calorimeter. Five data points between the mean evaporating temperatures of −38° C. and −22° C. were obtained.

Results

The results obtained are summarised in Tables 2-4. Mean Ev. Temp=Mean evaporation temperature; Air on condenser=temperature of the air blowing over the condenser; Press=pressure.

The results obtained are shown graphically in Graphs 1 to 6. Graph 1 shows the saturated vapour pressures for the blends investigated along with that for R22. The graph shows that the vapour pressures of the blends are only slightly higher than that for R22.

Graph 2 shows a comparison of the capacities with respect to R22 at a mean evaporating temperature of −30° C., a typical temperature at which these blends would be expected to operate. At this temperature, the butane blend is only 4% below the capacity of R22, and the capacity of the isobutane blend is 5.5% below that of R22.

The COP results obtained are shown in Graph 3. This graph shows that at a mean evaporating temperature of −30° C., the COP values of both the hydrocarbon blends are less than 1% below R22.

In Graph 4, the capacity is fixed to that of R22 at the evaporating temperature of −30° C. The COPs at this constant capacity for the different refrigerants can now be compared. The graph shows that both the butane blend (by 2.5%) and the isobutane blend (by 3.0%) are more efficient than R22 for this given capacity.

The capacity of the hydrocarbon blends relative to R22 is shown in Graph 5. The lines for the two blends are parallel to one another and the capacities are similar with that of the isobutane blend being slightly lower.

Graph 6 shows the COP of the RX blends relative to R22. The COP of R22 and that of the two blends is shown to be similar. The lines of the hydrocarbon blends cross over one another (and R22) at a mean evaporating temperature of −32° C. showing the increase in the relative COP of R22 and the decrease in the relative COP of the isobutane blend. As before, the differences are minimal.

TABLE 1

Results of the experimental SVP measurements and the glide from REFPROP6

| Description | SVP Equation (see note 1) | Glide equation (see note 2) |
|---|---|---|
| Butane (3.5%) blend R125/134a/600 (65.0/31.5/3.5) | y = −2347.45820x + 12.96325 $R^2$ = 0.99999 | y = −0.02618x + 3.51740 $R^2$ = 0.99790 |
| Isobutane (3.5%) blend R125/134a/600a (64.9/31.7/3.4) | y = −2356.045324x + 12999729 $R^2$ = 0.999956 | y = −000001$x^3$ − 0.000012$x^2$ − 0.028998x + 3.628716 |
| R22 | (see note 3) | Not applicable |

TABLE 2

R22 CONDENSING AT 40° IN LT-CALORIMETER

| Mean Ev. Temp ° C. | Discharge Temp ° C. | Air On Condenser ° C. | Discharge absolute Press Mpa | Condensing Temp ° C. | Evaporator Inlet Press MPa | Evap Temp BUBBLE ° C. | Evap Temp DEW ° C. | Compressor Power kwh | Capacity Heat Input kwh | C.O.P. | Evap. Superheat ° C. |
|---|---|---|---|---|---|---|---|---|---|---|---|
| −37.6 | 149.9 | 20.8 | 1.439 | 40.1 | 0.016 | −37.6 | −37.6 | 1.161 | 0.614 | 0.53 | 8.3 |
| −35.9 | 154.5 | 22.3 | 1.425 | 39.8 | 0.025 | −35.9 | −35.9 | 1.208 | 0.846 | 0.70 | 8.5 |
| −34.0 | 156.1 | 22.2 | 1.433 | 40.0 | 0.036 | −34.0 | −34.0 | 1.283 | 1.031 | 0.80 | 8.3 |
| −31.6 | 156.3 | 22.9 | 1.438 | 40.1 | 0.051 | −31.6 | −31.6 | 1.375 | 1.282 | 0.93 | 8.3 |
| −29.5 | 155.7 | 23.4 | 1.450 | 40.4 | 0.065 | −29.5 | −29.5 | 1.388 | 1.412 | 1.02 | 7.8 |
| −28.8 | 152.8 | 22.0 | 1.447 | 40.4 | 0.071 | −28.8 | −28.8 | 1.418 | 1.508 | 1.06 | 8.1 |
| −28.1 | 154.7 | 23.9 | 1.430 | 39.9 | 0.076 | −28.1 | −28.1 | 1.457 | 1.586 | 1.09 | 8.4 |
| −25.4 | 152.7 | 22.7 | 1.449 | 40.4 | 0.096 | −25.4 | −25.4 | 1.593 | 1.992 | 1.25 | 8.0 |
| −24.0 | 152.8 | 23.8 | 1.446 | 40.3 | 0.108 | −24.0 | −24.0 | 1.646 | 2.167 | 1.32 | 8.6 |
| 22.1 | 149.6 | 23.8 | 1.450 | 40.4 | 0.124 | −22.1 | −22.1 | 1.688 | 2.387 | 1.41 | 8.4 |

TABLE 3

BUTANE (3.5%) CONDENSING AT 40° C. IN LT-CALORIMETER

| Mean Ev. Temp ° C. | Discharge Temp ° C. | Air On Condenser ° C. | Discharge absolute Press Mpa | Condensing Temp ° C. | Evaporator Inlet absolute press MPa | Evap Temp BUBBLE ° C. | Evap Temp DEW ° C. | Compressor Power kwh | Capacity Heat Input kwh | C.O.P. | Evap. Superheat ° C. | Total Superheat ° C. |
|---|---|---|---|---|---|---|---|---|---|---|---|---|
| −37.4 | 114.1 | 20.8 | 1.528 | 39.9 | 0.025 | −39.7 | −35.1 | 1.094 | 0.629 | 0.58 | 7.7 | 47.0 |
| −34.2 | 115.8 | 21.6 | 1.529 | 39.9 | 0.044 | −36.4 | −31.9 | 1.237 | 0.976 | 0.79 | 7.9 | 43.5 |
| −30.4 | 112.1 | 21.1 | 1.539 | 40.2 | 0.068 | −32.6 | −28.3 | 1.336 | 1.317 | 0.99 | 7.8 | 39.7 |
| −25.9 | 108.9 | 21.4 | 1.540 | 40.2 | 0.102 | −28.0 | −23.8 | 1.459 | 1.729 | 1.18 | 8.0 | 36.7 |
| −22.5 | 106.8 | 22.6 | 1.543 | 40.3 | 0.132 | −24.6 | −20.4 | 1.592 | 2.161 | 1.36 | 8.3 | 35.5 |

TABLE 4

ISOBUTANE BLEND (3.5%) CONDENSING AT 40° C. IN LT-CALORIMETER

| Mean Ev. Temp ° C. | Discharge Temp ° C. | Air On Condenser ° C. | Discharge absolute Press Mpa | Condensing Temp ° C. | Evaporator Inlet absolute press MPa | Evap Temp BUBBLE ° C. | Evap Temp DEW ° C. | Compressor Power kwh | Capacity Heat Input kwh | C.O.P. | Evap. Superheat ° C. | Total Superheat ° C. |
|---|---|---|---|---|---|---|---|---|---|---|---|---|
| −37.7 | 114.6 | 23.1 | 1.544 | 40.0 | 0.023 | −40.1 | −35.3 | 1.033 | 0.596 | 0.58 | 8.0 | 49.0 |
| −34.3 | 116.2 | 23.2 | 1.544 | 39.9 | 0.043 | −36.6 | −31.9 | 1.194 | 0.950 | 0.80 | 8.3 | 44.8 |
| −29.8 | 113.1 | 22.2 | 1.544 | 40.0 | 0.072 | −32.1 | −27.5 | 1.353 | 1.361 | 1.01 | 8.5 | 40.1 |
| −26.2 | 109.7 | 22.4 | 1.538 | 39.8 | 0.100 | −28.4 | −23.9 | 1.440 | 1.682 | 1.17 | 8.6 | 37.7 |
| −21.5 | 106.4 | 24.2 | 1.562 | 40.4 | 0.140 | −23.6 | −19.3 | 1.622 | 2.252 | 1.39 | 8.2 | 35.4 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A composition consisting of:
   (a) pentafluoroethane in an amount of from 62% to 67% by weight based on the weight of the composition,
   (b) 1,1,1-tetrafluoroethane in an amount of from 26% to 36% by weight based on the weight of the composition, and
   (c) isobutane in an amount from 3% to 4% by weight based on the weight of the composition.

2. A composition according to claim 1, wherein the isobutane is an amount from 3.5% by weight based on the weight of the composition.

3. A composition according to claim 1 in which component (a) is present in an amount above 64% up to 66% by weight based on the weight of the composition.

4. A composition according to claim 1 in which component (b) is present in an amount about 28% to about 32% by weight based on the weight of the composition.

5. A refrigeration apparatus containing, as refrigerant, a composition as claimed in claim 1.

6. A composition according to claim 1 wherein the component (a) is 64.9 weight %, component, component (b) is 31.7 weight %, and component (c) is 3.4 weight %.

7. A composition consisting of:
   (a) pentafluoroethane in an amount of from 62% to 67% by weight based on the weight of the composition,
   (b) 1,1,1-tetrafluoroethane in an amount of from 26% to 36% by weight based on the weight of the composition,
   (c) isobutane in an amount from 3% to 4% by weight based on the weight of the composition, and (d) a lubricant selected from the group consisting of mineral oils, alkylbenzene lubricants, synthetic lubricants, and fluorinated oils and mixtures thereof.

8. A composition according to claim 7 in which component (c) is present in an amount of about 3.5% by weight based on the weight of the composition.

9. A refrigeration apparatus containing, as refrigerant, a composition as claimed in claim 7.

10. A composition according to claim 7, wherein the lubricant is selected from the group comprising napththenic oils, paraffin oils, and silicone oils, polyol esters, polyalkylenelycols, polyoxypropylene gycols, fluorinated oils and mixtures thereof.

11. A composition consisting of:
(a) pentafluoroethane in an amount of from 62% to 67% by weight based on the weight of the composition,
(b) 1,1,1,2-tetrafluoroethane in an amount of from 26% to 36% by weight based on the weight of the composition,
(c) isobutane in an amount from 3% to 4% by weight based on the weight of the composition,
(d) a lubricant selected from the group consisting of mineral oils, alkylbenzene lubricants, synthetic lubricants, and fluorinated oils and mixtures thereof, and
(e) an additive selected from the group consisting of extreme pressure, antiwear improvers, oxidation inhibitors, thermal stability improvers, corrosion inhibitors improvers, viscosity index improvers, pour point depressants, detergents, anti-foaming agents, and viscosity adjusters.

12. A composition, consisting of:
(a) pentafluoroethane in an amount of from 62% to 67% by weight based on the weight of the composition,
(b) 1,1,1,2-tetrafluoroethane in an amount of from 26% to 36% by weight based on the weight of the composition,
(c) isobutane in an amount from 3% to 4% by weight based on the weight of the composition, and
(d) an additive selected from the group consisting of extreme pressure, antiwear improvers, oxidation inhibitors, thermal stability improvers, corrosion inhibitors improvers, viscosity index improvers, pour point depressants, detergents, anti-foaming agents, and viscosity adjusters.

* * * * *